United States Patent [19]
Raman

[11] Patent Number: 6,134,598
[45] Date of Patent: *Oct. 17, 2000

[54] DATA STREAM PROCESSING ON NETWORKED COMPUTER SYSTEM LACKING FORMAT-SPECIFIC DATA PROCESSING RESOURCES

[75] Inventor: Thiruvilwamalai V. Raman, Mt. View, Calif.

[73] Assignee: Adobe Systems Incorporated, San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/862,648

[22] Filed: May 23, 1997

[51] Int. Cl.[7] .............................. G06F 13/00; G06F 17/00
[52] U.S. Cl. .......................... 709/246; 709/203; 709/206
[58] Field of Search ........................... 395/200.76, 200.3, 395/200.31, 200.33, 200.35, 200.48, 200.61; 340/825.52; 709/246, 203, 206, 217

[56] References Cited

U.S. PATENT DOCUMENTS

| | | | |
|---|---|---|---|
| 5,227,778 | 7/1993 | Vacon et al. ......................... | 340/825.52 |
| 5,675,507 | 10/1997 | Bobo, II .............................. | 364/514 R |
| 5,706,442 | 1/1998 | Anderson et al. ....................... | 395/227 |
| 5,727,159 | 3/1998 | Kikinis ................................. | 395/200.76 |
| 5,794,039 | 8/1998 | Guck ........................................ | 709/203 |
| 5,826,062 | 10/1998 | Fake, Jr. et al. ......................... | 709/206 |
| 5,848,415 | 12/1998 | Guck ........................................ | 709/303 |
| 5,864,870 | 1/1999 | Guck ........................................ | 707/104 |
| 5,911,776 | 6/1999 | Guck ........................................ | 709/217 |
| 5,918,013 | 6/1999 | Mighdoll et al. ....................... | 709/217 |

OTHER PUBLICATIONS

Fielding, et al., HTTP Working Group, Internet Draft <draft–ietf–http–v11–spec–06>, dated Jul. 4, 1996.
Fielding, et al., HTTP Working Group, Internet Draft <draft–ietf–http–v11–spec–rev–00.txt>, printed from the internet on Nov. 19, 1997.
http://www.coproductions.com/mmcomm/131.htm, Oct. 1996.

*Primary Examiner*—Glenton B. Burgess
*Assistant Examiner*—Quoc-Khanh Le
*Attorney, Agent, or Firm*—Fish & Richardson P.C.

[57] ABSTRACT

In a data network including server systems and client systems, a method of converting data from a first format unusable by a client system into a second format usable by the client system comprising the steps of sending the data to a parsing server capable of converting such data from the first format to the second format, parsing the data in the parsing server from the first format to the second format, and sending the data in the second format to the client system.

20 Claims, 11 Drawing Sheets

FIG. 12

DATA STREAM PROCESSING ON NETWORKED COMPUTER SYSTEM LACKING FORMAT-SPECIFIC DATA PROCESSING RESOURCES

BACKGROUND

The invention relates to processing data on a networked computer system lacking format-specific data processing resources.

Wide area networks (WANs), such as the Internet, facilitate the exchange of electronic data between heterogeneous computer systems. Through client/server mechanisms such as HyperText Transfer Protocol (HTTP) or File Transfer Protocol (FTP), data created or stored on one computer system can be made readily available for transfer to and use on another computer system.

In particular, computer systems on a WAN can be configured to operate as "clients" and "servers." With HTTP, for example, clients generate request messages which are sent over the WAN to servers. The request messages include a Uniform Resource Locator (URL), an alphanumeric string uniquely identifying the location of a data resource (e.g., a data file or a process for generating a stream of data) on the WAN. When a request message is received by a server, the server fetches data from the requested resource and transmits the data to the client.

One impediment to such an exchange, however, is data format incompatibility. Modern software programs, such as word processors, desktop publishing systems and multimedia systems, represent and store data in a wide variety of formats. The format of data determines how it should be interpreted in order to make it intelligible to a human user. A user wishing to perform a function (e.g., display, print, or edit) on data in a given format must therefore have access to facilities (e.g., software, printers, or other hardware) that can process (i.e., properly interpret) data in that format. If the user's computer system does not include facilities having the ability to process data in a given format, the user will not be able to use the data.

Because of the multiplicity of data formats currently used in conjunction with commercial computer systems, standard conventions have been developed which permit efficient data format identification. One such convention involves the use of filename extensions to indicate the format of data within the file. For example, a file with the name of "picture.gif" has the filename extension "gif" indicating that the file contains data in GIF format. Another widely used convention is Multipurpose Internet Mail Extensions (MIME). Under the MIME framework, data formats are registered with a central authority which issues a set of standard codes for identifying the formats. MIME codes are often used in network communications to identify the format of data being transmitted between computer systems.

Within a single computer system or organization, the problem of data format incompatibility is likely to be relatively insignificant since it is likely that all data created on the system for a given purpose will be created using the same software program and will thus have the same format. However, on a WAN connecting heterogeneous computer systems, the inability of computers systems to process data formatted elsewhere will likely be more significant.

One conventional approach to the problem of data format incompatibility is to maintain, on a given computer system, facilities capable of recognizing all of the data formats likely to be encountered by users of that system. This approach is generally not practical, however, in light of the expense involved, the need for users to learn how to operate multiple facilities, and the need to frequently add new facilities in light of the introduction of new data formats.

Another approach is to maintain on the given computer system a set of parser (data conversion) programs which are capable of converting data from one format to another. A user seeking to use data of a type which could not be processed by system's resident facilities would use a parser to translate the data into a format which could be. There are at least two disadvantages to this solution: First, the use of the parser will consume additional computer system resources since it must be executed every time data of a format which cannot be directly processed by the system is retrieved from the WAN. Moreover, the constantly changing variety and number of data formats makes the task of maintaining the ability to translate all necessary data formats a difficult one.

SUMMARY OF THE INVENTION

In general, in one aspect, the invention features, in a data network in which a multiplicity of data formats exist, a method for performing a particular function on data represented in a first data format, on a client system lacking resources to perform the function on data in the first data format but having resources to perform the function on data in a second data format. The method includes transmitting a request message from the client system to a parsing server, transmitting the data from a data server to the parsing server, parsing the data at the parsing server into the second data format, receiving on the client system the data parsed into the second format from the parsing server, and using a resource on the client system to perform the function on the parsed data. Preferred embodiments of the invention include one or more of the following features. The request message includes a Uniform Resource Locator specifying the location of the data on the network. The request message includes the data. The request message specifies the second data format. The request message specifies the first data format. The parsing server is selected from a pre-existing list of parsing servers. The parsing server is selected from among a set of parsing servers that respond to a request broadcast to the network. The pre-existing list of parsing servers is generated using information broadcast to the network by parsing servers. The pre-existing list of parsing servers is generated using information sent by parsing servers in response to messages broadcast to the network by the client system. The step of selecting the parsing server includes identifying the first data format, identifying which resources on the client can perform the function, identifying a set of data formats upon which the resources can perform the function, identifying the translation capabilities of parsing servers on the list, identifying a set of parsing servers that are capable of translating data from the first data format to one of the set of data formats and choosing a parsing server from the set. The step of identifying the translation capabilities of parsing servers includes accessing data stored on the client system. The step of identifying the translation capabilities of parsing servers includes sending messages to parsing servers over the network requesting them to indicate their translation capabilities and receiving messages from parsing servers indicating their capabilities. The network is a wide area network. The network is a local area network.

In general, in another aspect, the invention features a computer program, residing on a computer-readable medium, including instructions for causing a computer connected to a network to receive a request message from a client system over the network, receive data from a data server in a first format over the network, parse the data into a second data format, and transmit the data in the second format over the network to the client system.

In general, in another aspect, the invention features a parsing server for use on a network, including a digital computer and a computer program storage medium having a computer program stored thereon for execution on the digital computer. The computer program includes instructions for causing the computer to receive a request message from a client system over the network, receive data from a data server in a first format over the network, parse the data into a second data format, and transmit the data in the second format over the network to the client system.

In general, in another aspect, the invention features, in a network in which a multiplicity of data formats are recognized, a method for performing a particular function on data represented in a first data format, on a client system lacking resources to perform the function on data in the first data format, but having resources to perform the function on data in at least one other data format. The method includes identifying the first data format, identifying which resources on the client can perform the function, identifying a set of data formats upon which the resources can perform the function, identifying the translation capabilities of parsing servers on a list of parsing servers, identifying the set of parsing servers which are capable of translating data from the first data format to one of the set of data formats, choosing a parsing server from among the set of parsing servers, sending a request message from the client system to the chosen parsing server, which specifies the URL of the data, the first data format, and the second data format, sending the data specified by the URL from the data server to the parsing server, on the parsing server parsing the data into the second data format, sending the parsed data in the second data format from the parsing server to the client system, and using a resource on the client system to perform the function on the parsed data in the second data format.

Among the advantages of the invention are one or more of the following. Data can be readily exchanged among computer systems on a WAN notwithstanding the use of heterogeneous data formats on the WAN. The system load on a WAN for parsing data formats can be distributed among multiple servers. A computer system can perform functions on a multiplicity of data formats without maintaining on that system facilities capable of operating on all such formats. A computer system can perform functions on a multiplicity of data formats without using system resources to parse data into usable formats. Facilities for parsing a given data type need not be replicated on multiple systems on a WAN. Facilities for parsing a given data type on a WAN may be upgraded or modified without the need to upgrade or modify such facilities on all systems connected to the WAN.

Other features and advantages of the invention will become apparent from the following description and from the claims.

DESCRIPTION OF THE PREFERRED EMBODIMENTS

Figure 1A:
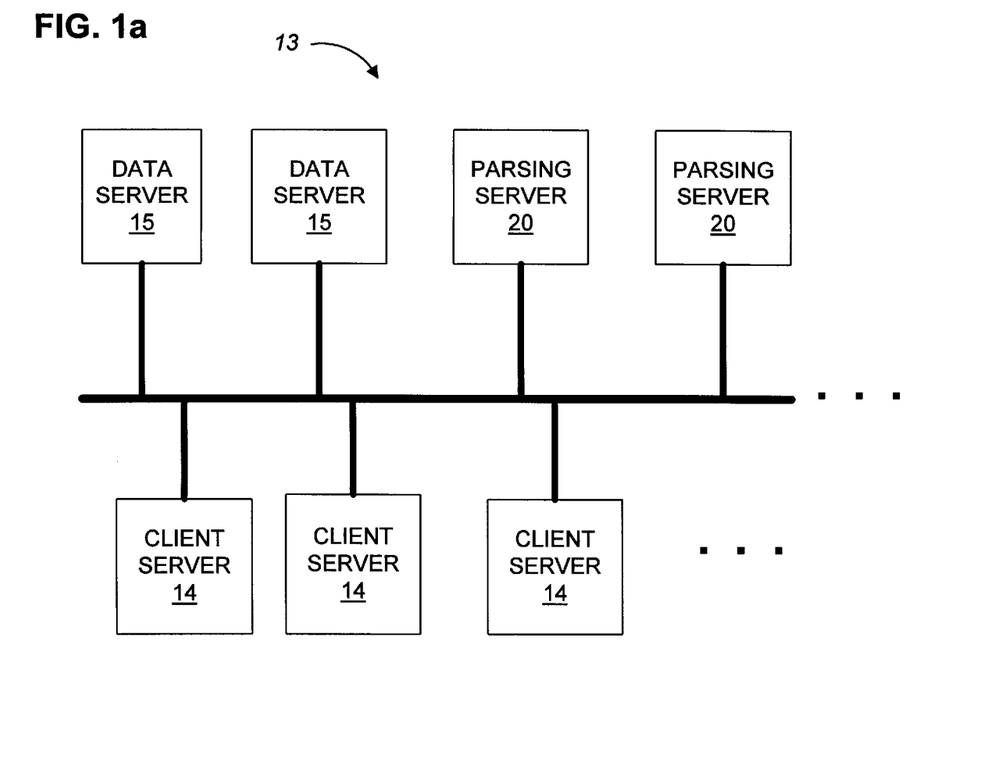
FIG. 1a is a schematic diagram of a WAN.

Shown in FIG. 1a is a simplified example of a WAN 13, including client systems 14, data servers 15 and parsing servers 20. Note that any computer connected to the WAN may act as a client system, a data server or a parsing server, or any combination of them.

Figure 1B:
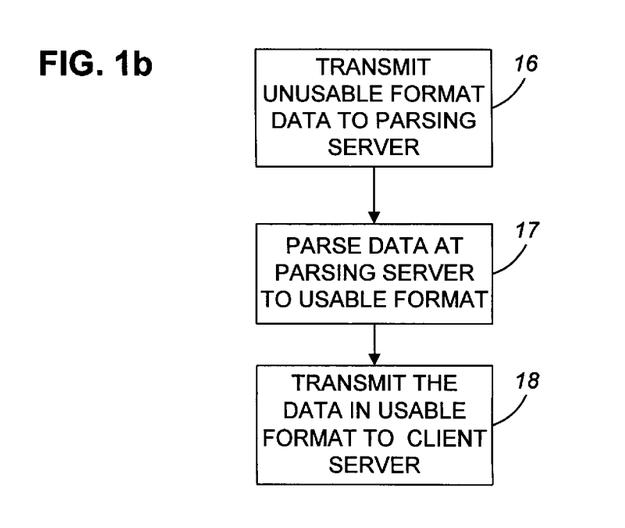
FIG. 1b is a flowchart showing the overall operation of the invention.

Shown in FIG. 1b is a flowchart showing the overall operation of the invention. Data in a first format, which cannot be used on a client system, is transmitted to a parsing server capable of converting such data from the first format to a second format which can be used by the client system (step 16). The data is then parsed on the parsing server into the second format (step 17), and transmitted to the client system (step 18).

Figure 2:
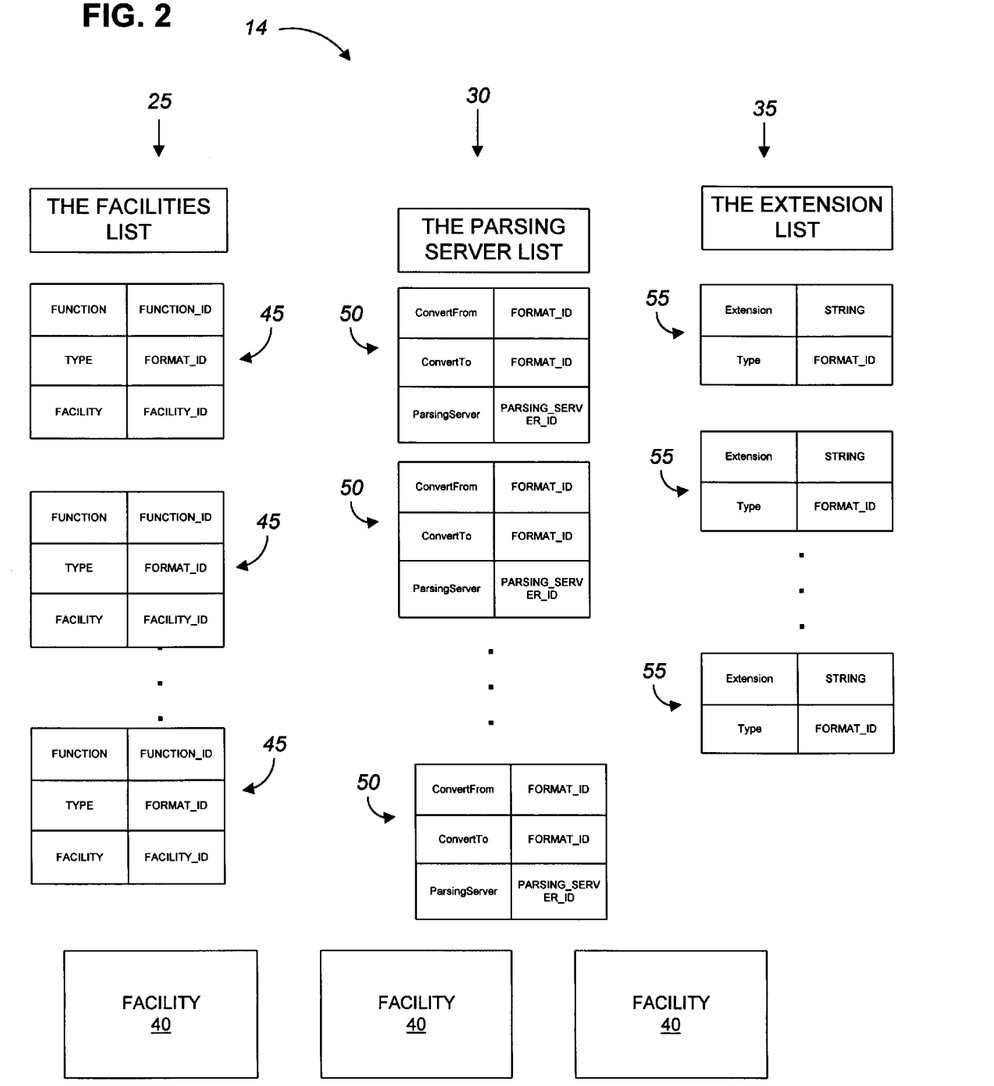
FIG. 2 is a schematic diagram of a client system.

Shown in FIG. 2 is a simplified diagram of a client system 14. A client system 14 maintains data structures including TheFacilitiesList 25, TheParsingServerList 30, TheExtensionList 35, and a set of Facilities 40. TheFacilitiesList includes a list of Facility Descriptors 45. Each Facility Descriptor 45 includes a Function field, containing a Function_ID, a Format field, containing a Format_ID, and a Facility field, containing a Facility_ID. A Function_ID identifies a function which can be performed on data, such as printing, viewing, or scanning for text. A Format_ID corresponds to a data format. A Facility_ID identifies a facility located on the client system. Each Facility Descriptor indicates that the specified Facility is capable of performing the specified Function on data of the specified Format.

TheParsingServerList 30 includes a list of parsing server Capability descriptors 50. Each parsing server capability descriptor 50 includes a ConvertFrom field and a ConvertTo field, both containing a Format_ID. Each capability descriptor also includes a parsing server field, containing a Parsing_Server_ID. Each Parsing_Server_ID uniquely identifies a parsing server connected to the WAN. Each parsing server capability descriptor indicates that the specified parsing server is capable of converting data from format ConvertFrom to data of format ConvertTo.

TheExtensionList includes a list of Extension Equivalents 55. Each Extension Equivalent includes an Extension, containing an alphanumeric string, and a Format, containing a Format_ID. Each Extension Equivalent indicates that the presence of the given Extension in a URL means that the URL locates data in the specified Format.

Figure 3:
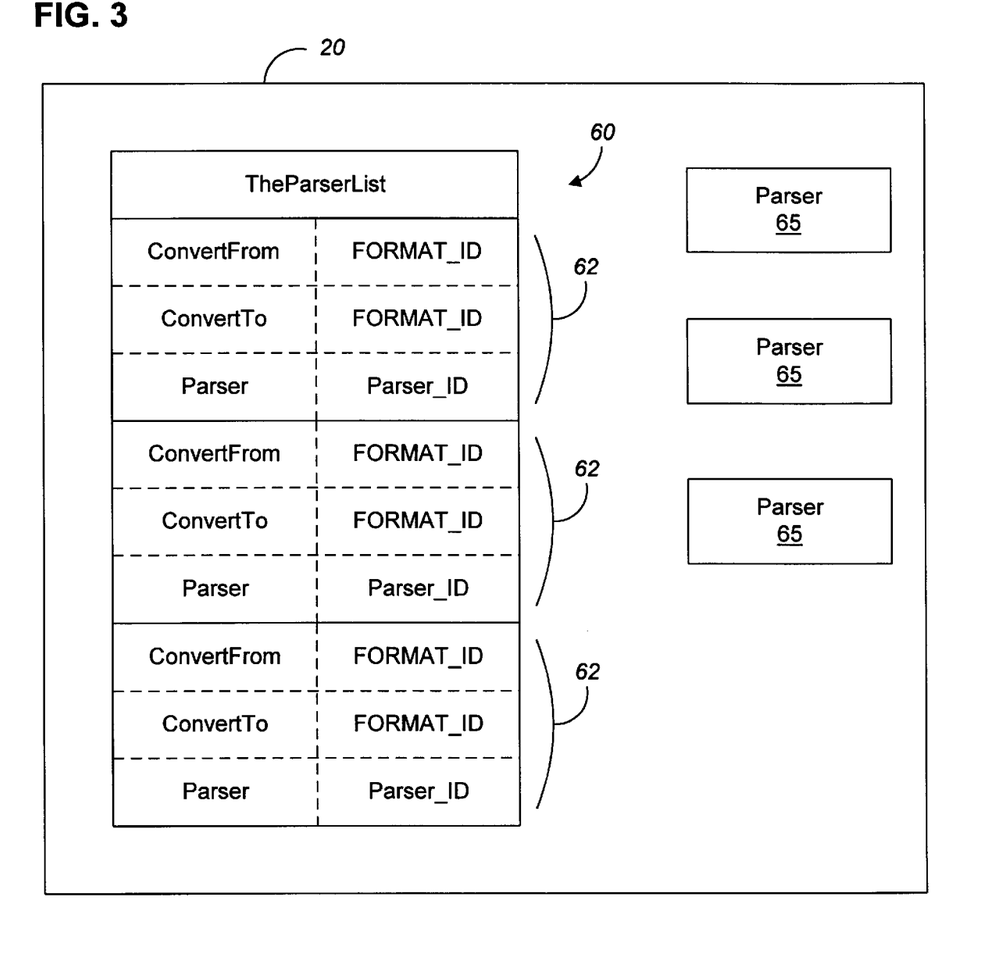
FIG. 3 is a schematic diagram of a parsing server.

Shown in FIG. 3 is a simplified diagram of a parsing server 20. A parsing server maintains data structures including TheParserList 60, and a set of Parsers 65. TheParserList includes a list of Parser capability descriptors 62. Each Parser capability descriptor 62 includes a ConvertFrom field and a ConvertTo field, both containing a Format_ID. Each Parser capability descriptor 62 also contains a Parser field containing a Parser_ID, which uniquely identifies a Parser located on a parsing server. Each Parser capability descriptor indicates that the specified Parser is capable of converting data from format ConvertFrom to format ConvertTo.

Figure 4:
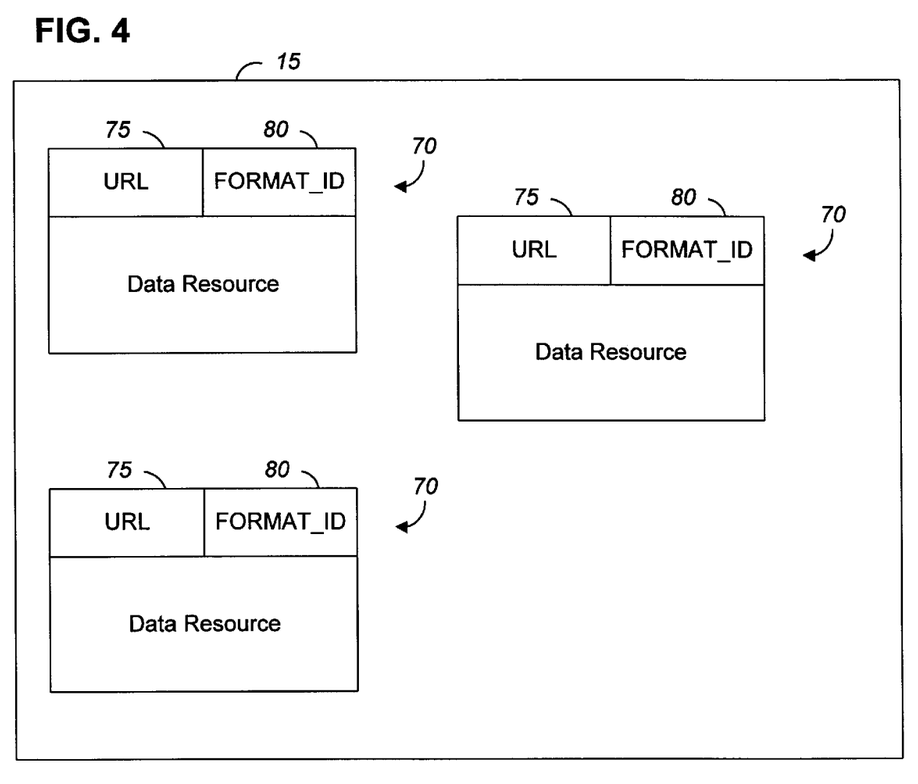
FIG. 4 is a schematic diagram of a data server.

Shown in FIG. 4 is a simplified diagram of a data server 15. A data server maintains a set of Data Resources 70. Each Data Resource is either a data file, or a process which produces a sequence of data. Each Data Resource is associated with a URL 75, which uniquely identifies the Data Resource on the WAN, and a Format_ID 80.

Figure 5:
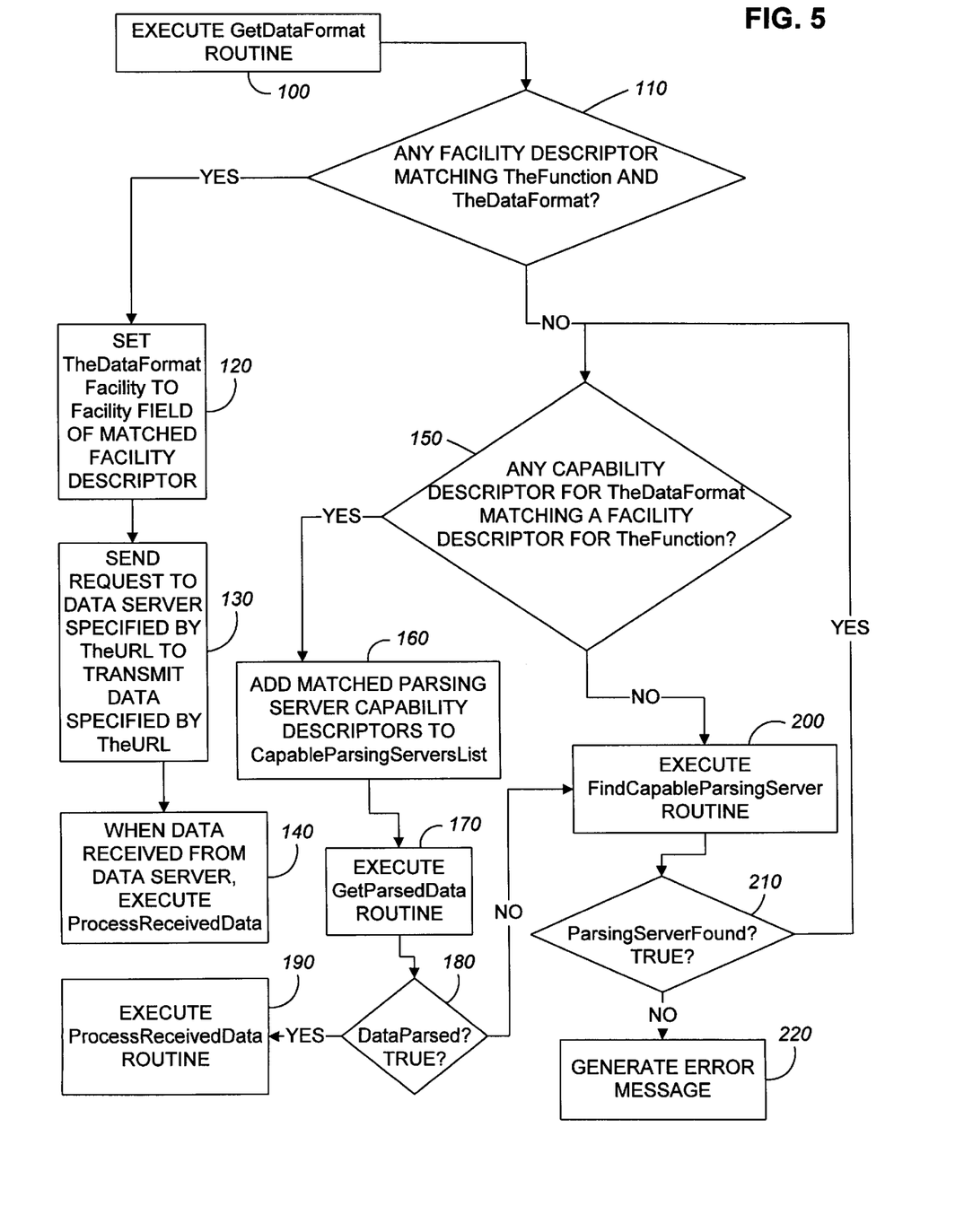
FIG. 5 is a flowchart showing the steps taken by a client system in performing a given function on a specified resource.

Shown in FIG. 5 is a flowchart showing the steps taken by a client system in performing a given function (specified by the variable TheFunction), on a resource specified by a given URL, TheURL. (The client system may receive the URL from a variety of sources. For example, it may be specified by a user, or it may be specified by a hypertext link.) First, the routine GetDataFormat is called (step 100). As explained in more detail below, GetDataFormat sets a global variable TheDataFormat equal to the Format_ID representing the data format of the data to be retrieved from TheURL. Next, TheFacilitiesList is checked to see if any of the Facility Descriptors has a Function field matching TheFunction, and a Format field matching TheDataFormat (step 110).

If a match is found, the global variable TheDataFormatFacility is set equal to the Facility field of the matched Facility Descriptor (step 120). Next, the client system sends a request to the data server specified by TheURL, requesting the data server to transmit the data specified by TheURL (step 130). When the data is received, the routine ProcessReceivedData is executed (step 140).

If no match is found on TheFacilitiesList, TheParsingServerList is checked to see if any of the parsing server capability descriptors has a ConvertFrom field equal to TheDataFormat and a ConvertTo field equal to the Format field of one of the Facility Descriptors on TheFacilitiesList, such that the Facility Descriptor also has a Function field equal to TheFunction (step 150). For each match found, the matched parsing server capability descriptor is added to the list CapableParsingServersList (step 160). Then, the routine GetParsedData is executed (step 170). If, after GetParsedData is executed, the variable DataParsed? is TRUE (step 180), the routine ProcessReceivedData is executed (step 190).

If no match is found, or if the variable DataParsed? is FALSE after GetParsedData is executed, the routine FindCapableParsingServer is executed (step 200). Then the flag ParsingServerFound? is checked (step 210). If its value is FALSE, no appropriate parsing server was found, and the client system will be unable to perform the requested function on the specified resource. In this case, an error message is returned to the user (step 220).

If ParsingServerFound? is TRUE, control returns to step 150.

Figure 6:
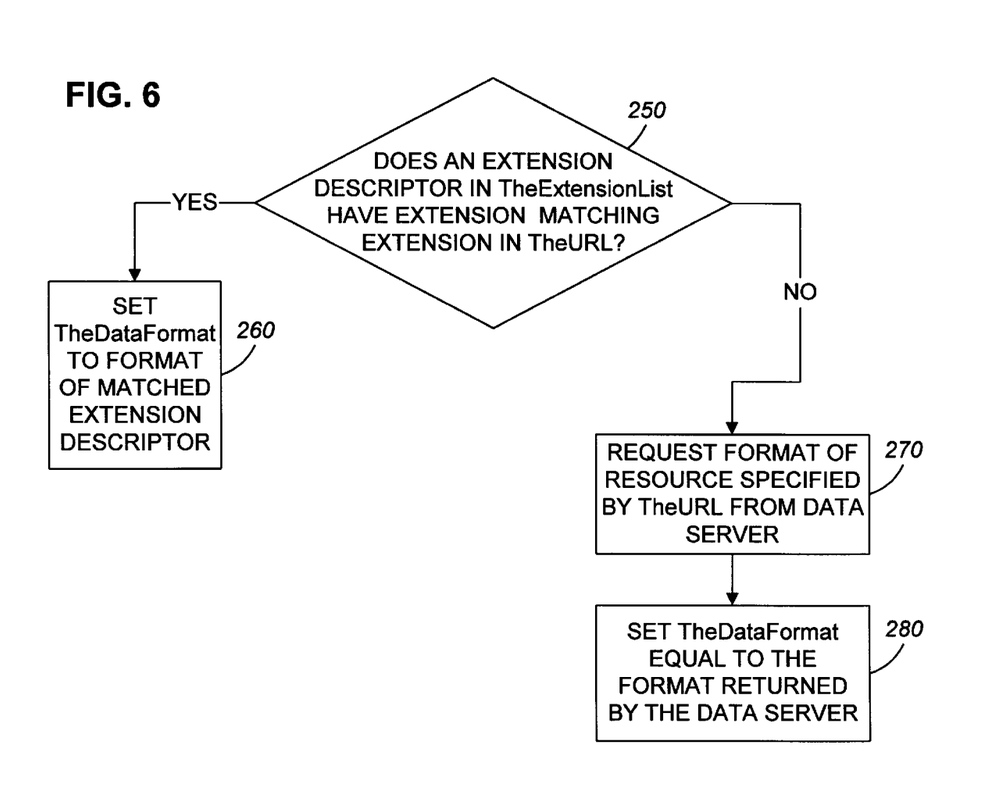
FIG. 6 is a flowchart showing the steps taken by the routine GetDataFormat on a client system.

Shown in FIG. 6 are the steps taken by the routine GetDataFormat. First, TheExtensionList is scanned to determine whether the TheURL contains an Extension matching the Extension field of one of the Extension Descriptors. If a match is found, the variable TheDataFormat is set to the Format of that Extension Descriptor (step 260).

If no match is found, a message is sent to the data server specified by TheURL, requesting it to transmit the Format_ID of the resource specified by TheURL (step 270). When the resulting Format_ID is received from the data server, the variable TheDataFormat is set accordingly (step 280).

Figure 7:
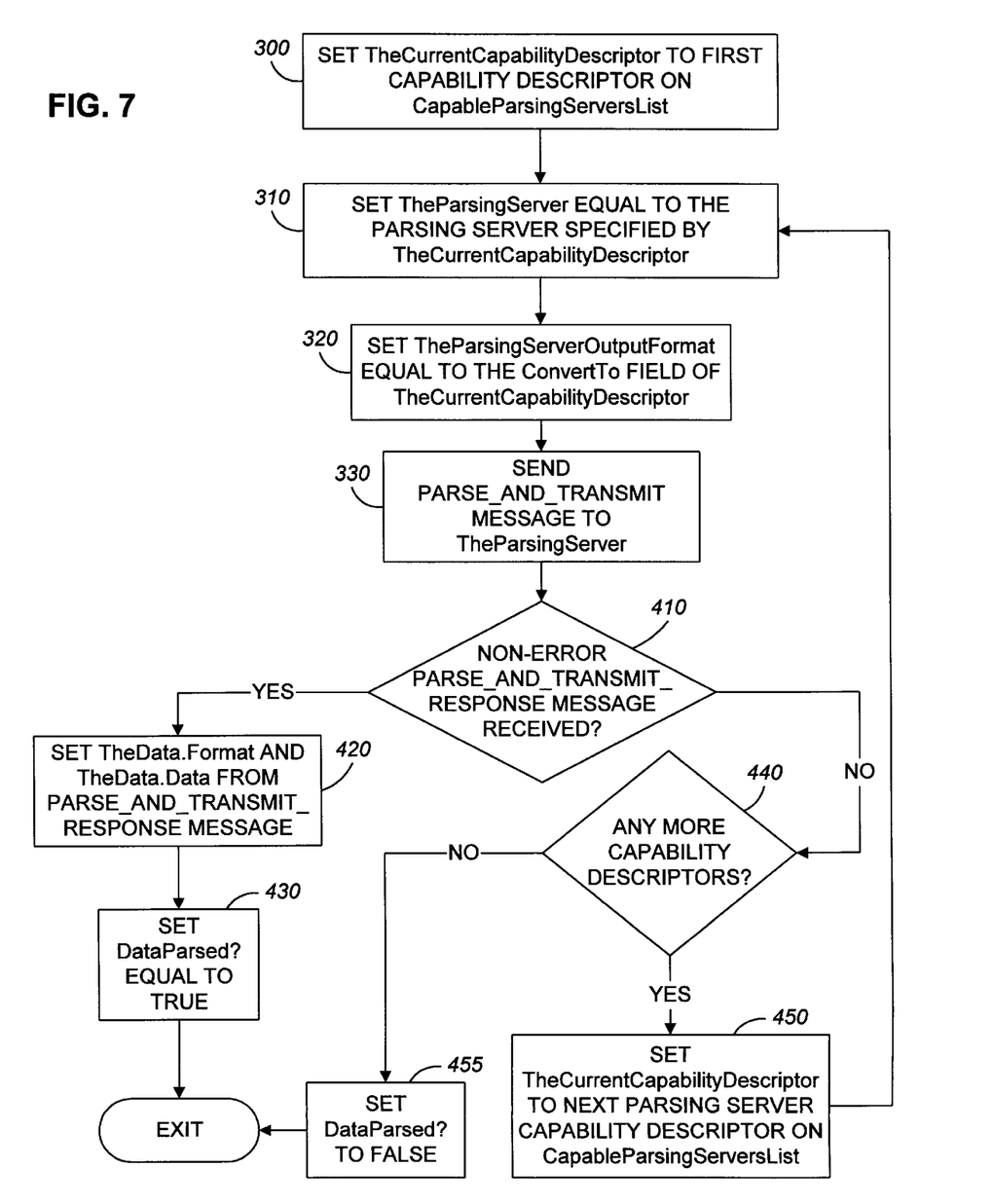
FIG. 7 is a flowchart showing the steps taken by the routine GetParsedData on a client system.
Figure 7A:
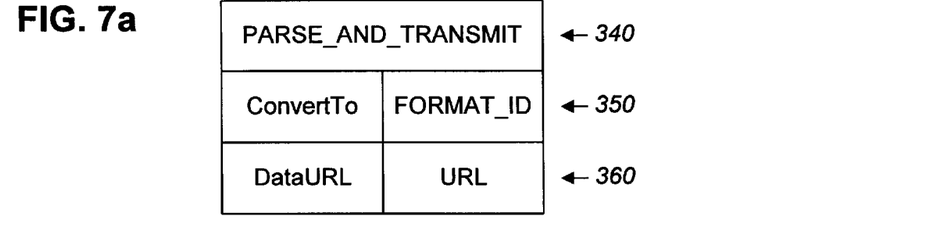
FIG. 7a is a schematic diagram of a PARSE_AND_TRANSMIT message.

Shown in FIG. 7 are the steps taken by the routine GetParsedData. First, the variable TheCurrentCapabilityDescriptor is set equal to the first parsing server capability descriptor on the CapableParsingServersList (step 300). Then, the variable TheParsingServer is set equal to the parsing server field of first parsing server capability descriptor on the list CapableParsingServersList (step 310), and the variable TheParsingServerOutputFormat is set to the ConvertTo field of that Descriptor (step 320). A PARSE_AND_TRANSMIT message is sent to TheParsingServer (step 330). Shown in FIG. 7a is a simplified diagram of a PARSE_AND_TRANSMIT message. The message contains a Label 340 indicating that it is a PARSE_AND_TRANSMIT message, a ConvertTo field 350 containing a Format_ID equal to the value of TheParsingServerOutputFormat, and a DataURL field 360 containing the contents of TheURL.

Figure 7B:
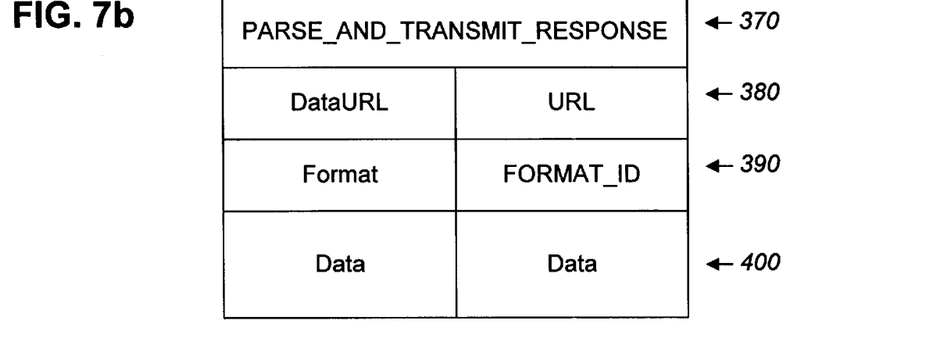
FIG. 7b is a schematic diagram of a PARSE_AND_TRANSMIT_RESPONSE message.

Except in cases of error conditions, a parsing server will respond to a PARSE_AND_TRANSMIT message with a PARSE_AND_TRANSMIT_RESPONSE message. Shown in FIG. 7b is a simplified diagram of a PARSE_AND_TRANSMIT_RESPONSE message. The message contains a Label 370 indicating that it is a PARSE_AND_TRANSMIT_RESPONSE message, a DataURL field 380 containing the URL of the resource which was parsed, a Format field 390 containing a Format_ID, and a Data field 400, containing the parsed data. If, within a specified timeout period after the PARSE_AND_TRANSMIT message is sent, a non-error PARSE_AND_TRANSMIT_RESPONSE message is received from TheParsingServer (step 410), the variables TheData.Format and TheData.Data are set to the Format and Data fields of the PARSE_AND_TRANSMIT_RESPONSE message (step 420). The variable DataParsed? is set to TRUE (step 430), and the routine exits.

If a PARSE_AND_TRANSMIT_RESPONSE message is not received from TheParsingServer within a specified timeout period (or if an error message is received), the list CapableParsingServicerList is checked to determine whether any additional Parser Serving capability descriptors remain on the list (step 440). If so, TheCurrentCapabilityDescriptor is set to the next unchecked parsing server capability descriptor on CapableParsingServersList (step 450). Control then returns to step 310. If not, the variable DataParsed? is set to FALSE (step 455), and the routine exits.

Figure 8:
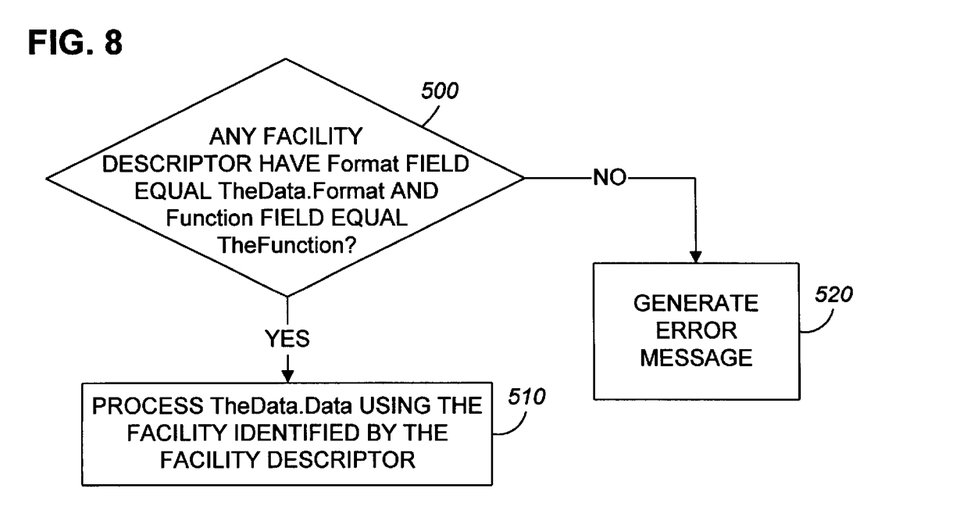
FIG. 8 is a flowchart showing the steps taken by the routine ProcessReceivedData on a client system.

FIG. 8 shows the steps taken by the routine ProcessReceivedData. TheFacilitiesList is checked to determine whether there exists a Facility Descriptor with a Format equal to TheData.Format, and a Function equal to TheFunction (step 500). If so, the Facility identified by Facility Descriptor is used to process the data in TheData.Data (step 510). If not, an error is returned (step 520).

Figure 9:
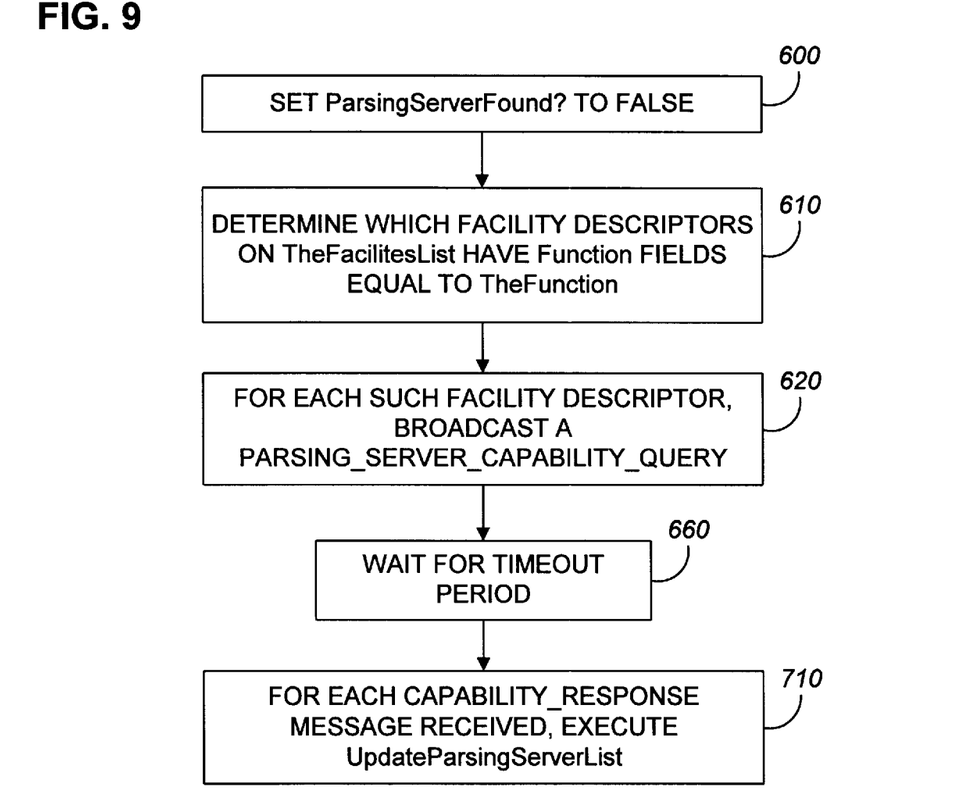
FIG. 9 is a flowchart showing the steps taken by the routine FindCapableParsingServer on a client system.
Figure 9A:
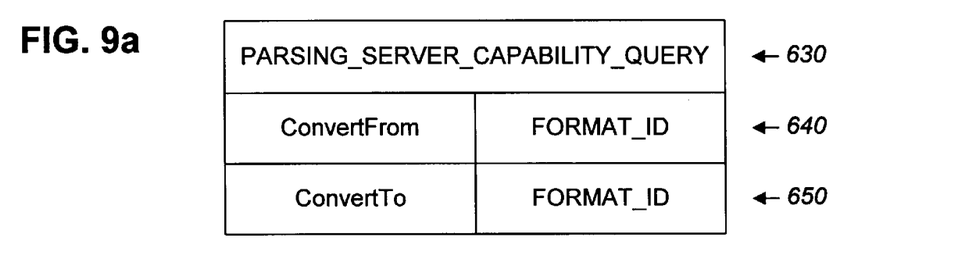
FIG. 9a is a schematic diagram of a PARSING_SERVER_CAPABILITY_QUERY message.

FIG. 9 shows the steps taken by the routine FindCapableParsingServer. First, the flag ParsingServerFound? is set to FALSE (step 600). Then, TheFacilitiesList is scanned to determine which Facility Descriptors have Function fields equal to TheFunction (step 610). For each descriptor found, a PARSING_SERVER_CAPABILITY_QUERY message is then broadcast over the WAN (step 620). Shown in FIG. 9a is a simplified diagram of the PARSING_SERVER_CAPABILITY_QUERY message. It contains a Label field identifying it as a PARSER_SERVER_CAPABILITY_QUERY message 630, a ConvertFrom field 640 and a ConvertTo field 650 containing Format_IDs. The ConvertFrom field will have the value of TheDataFormat, and the ConvertTo field will have the value of the Format field of the Facility Descriptor.

Figure 9B:
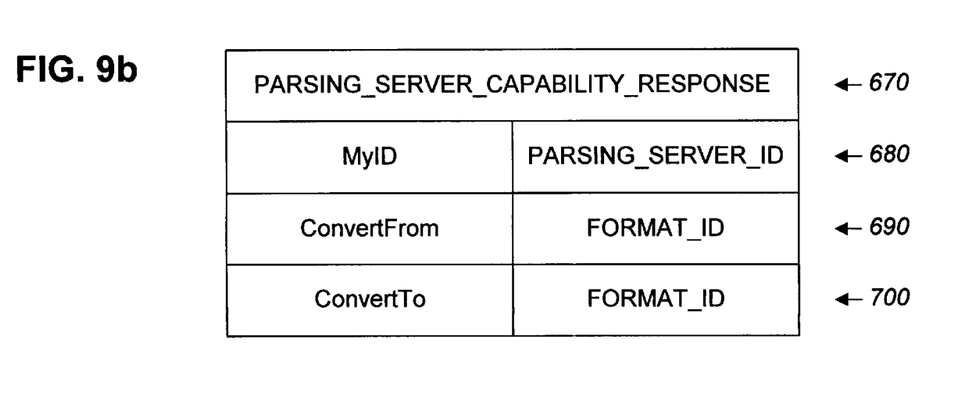
FIG. 9b is a schematic diagram of a PARSING_SERVER_CAPABILITY_RESPONSE message.

The client system then waits for a specified timeout period to receive PARSING_SERVER_CAPABILITY_RESPONSE messages (step 660). Shown in FIG. 9b is a simplified diagram of a PARSING_SERVER_CAPABILITY_RESPONSE message. It contains a Label 670 identifying it as a PARSING_SERVER_CAPABILITY_RESPONSE message, a MyID field 680 containing the Parsing_Server_ID of the parsing server, and a ConvertFrom field 690 and a ConvertTo field 700 both containing Format_IDs, indicating the parsing server's ability to convert data from format ConvertFrom to format ConvertTo.

Figure 10:
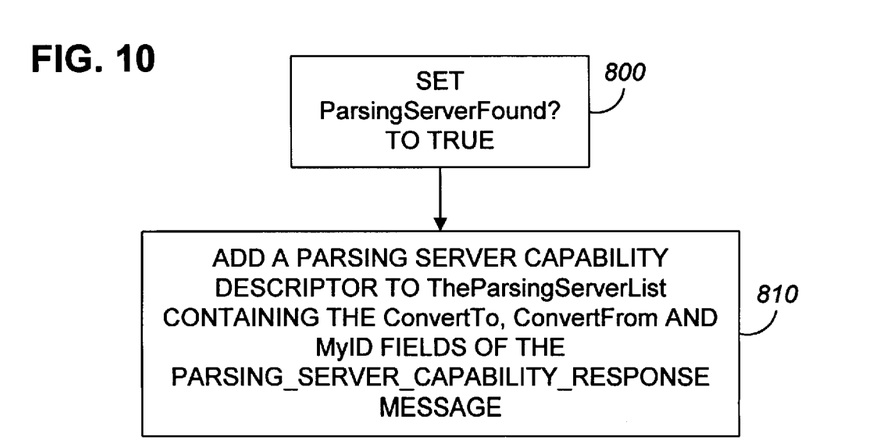
FIG. 10 is a flowchart showing the steps taken by the routine UpdateParsingServerList on a client system.

For each PARSING_SERVER_CAPABILITY_RESPONSE message received, the routine UpdateParsingServerList is executed (step 710). FIG. 10 shows the steps taken by UpdateParsingServerList. First, the flag ParsingServerFound? is set to TRUE (step 800). Then a parsing server capability descriptor is added to the TheParsingServerList containing the ConvertFrom, ConvertTo and MyID fields of the PARSING_SERVER_CAPABILTY_RESPONSE message (step 810).

Figure 11:
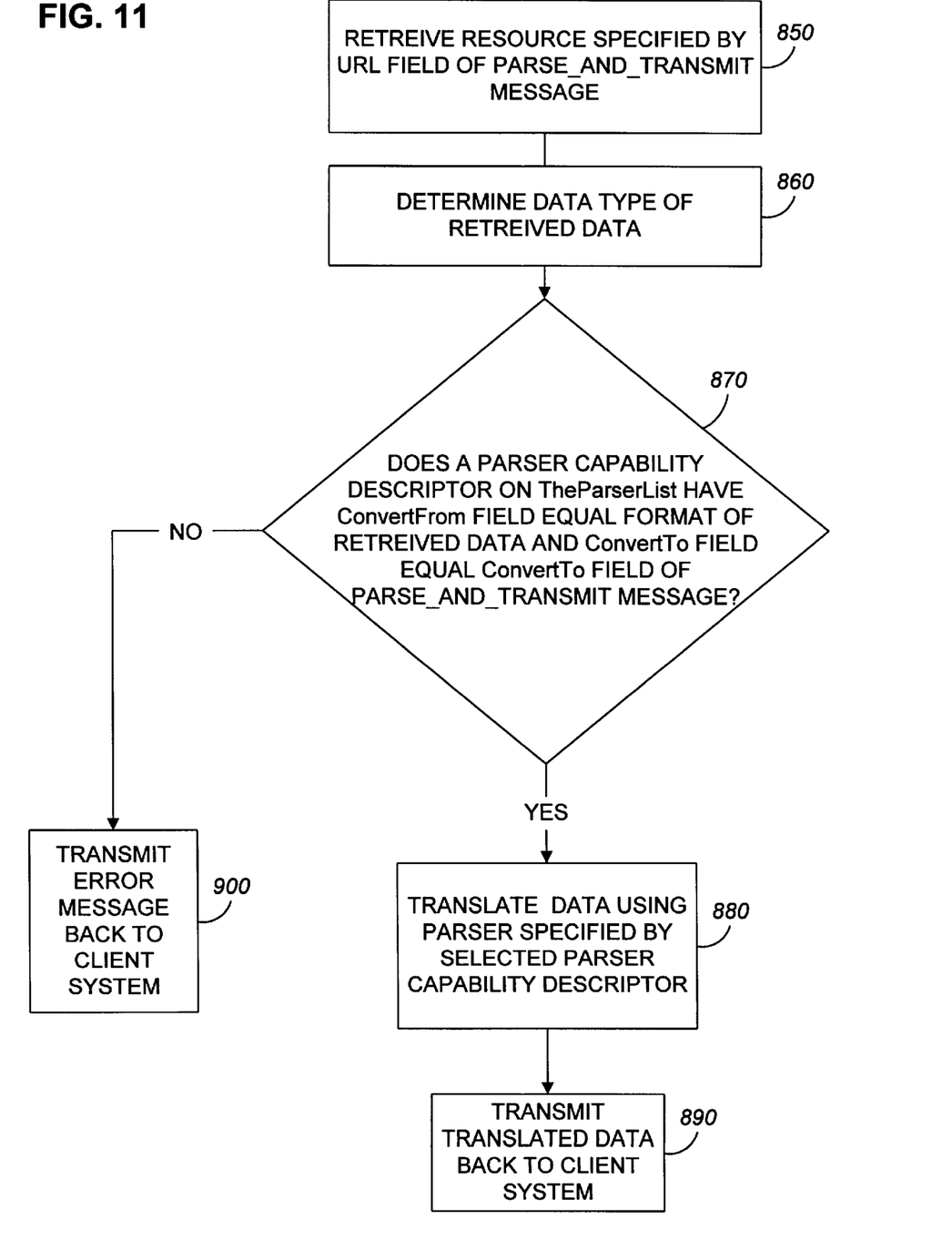
FIG. 11 is a flowchart showing the steps taken by a parsing server in response to a PARSE_AND_TRANSMIT message.

FIG. 11 shows the steps taken by a parsing server in response to a PARSE_AND_TRANSMIT message. First, the Resource specified by the URL field of the PARSE_AND_TRANSMIT message is retrieved from the data server on which it is located (step 850). The data format of the retrieved data is then determined (step 860). TheParserList is then examined to determine whether there is a Parser capability descriptor having a ConvertFrom field equal to the format of the data, and a ConvertTo field equal to the ConvertTo field of the PARSE_AND_TRANSMIT message (step 870). If a matching Parser capability descriptor is found, the data is translated to the ConvertTo format using the Parser specified by the Parser capability descriptor (step 880). The resulting translated data is then transmitted back to the client system (step 890). If no matching Parser Capability Descriptor is found, an error message is transmitted back to the client system (step 900).

Figure 12:
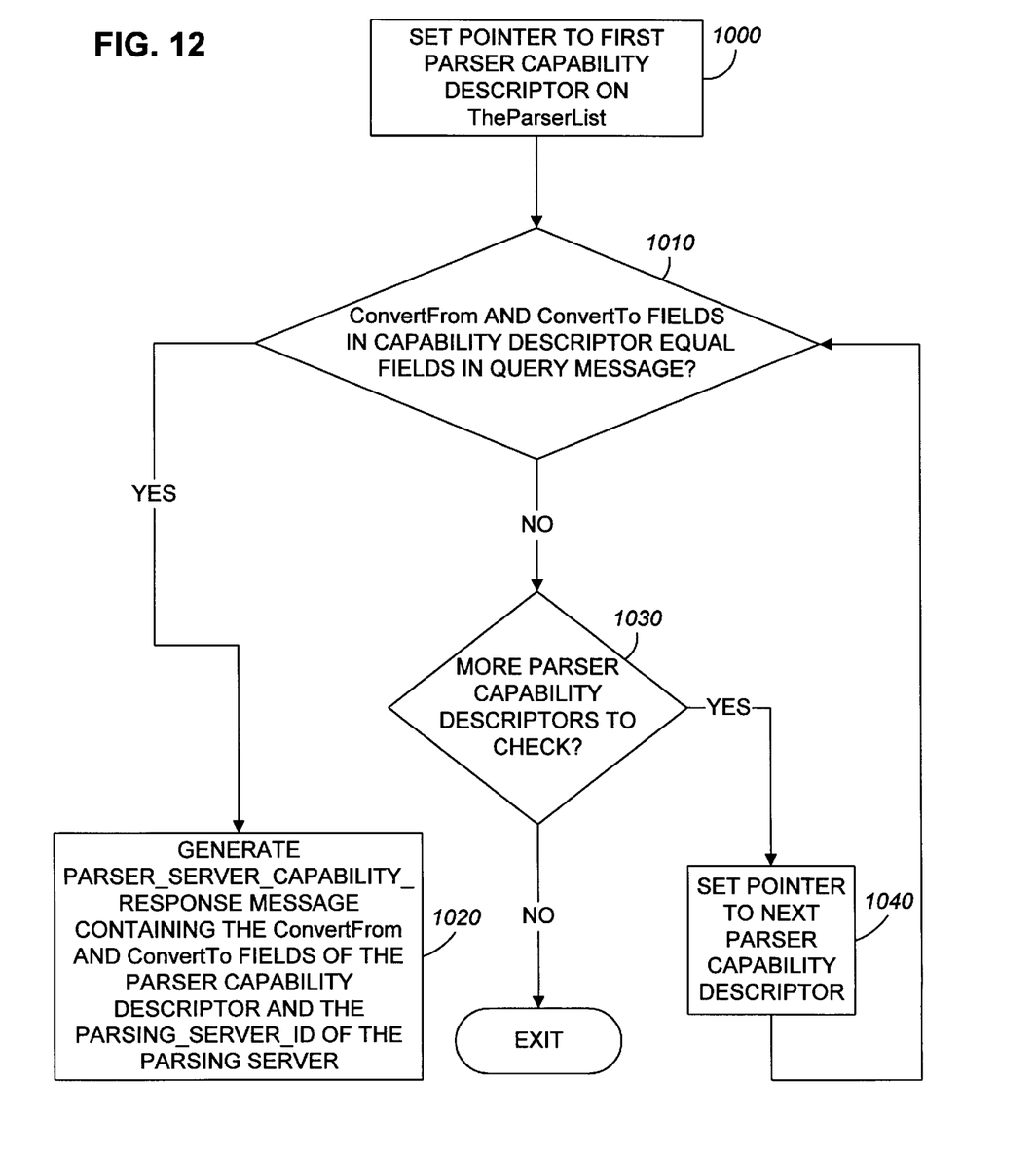
FIG. 12 is a flowchart showing the steps taken by a parsing server in response to a PARSING_SERVER_CAPABILITY_QUERY message.

FIG. 12 shows the steps taken by a parsing server in response to a PARSING_SERVER_CAPABILITY_QUERY. First, a pointer is set to the first Parser capability descriptor on TheParserList (step 1000). If the ConvertFrom and ConvertTo fields of the PARSING_SERVER_CAPABILITY_QUERY message equal the ConvertFrom and ConvertTo fields of the Parser capability descriptor (step 1010), a PARSER_SERVER_CAPABILITY_RESPONSE message is then generated containing the ConvertFrom and ConvertTo fields of the Parser capability descriptor, as well as the Parsing_Server_ID of the parsing server (step 1020). If the ConvertFrom and ConvertTo fields do not match, TheParserList is checked to see whether there remain addition Parser capability descriptors (step 1030). If so, then the pointer is then set to the next such Descriptor (step 1040) and control returns to step 1010.

The invention may be implemented in digital electronic circuitry or in computer hardware, firmware, software, or in combinations of them. Apparatus of the invention may be implemented in a computer program product tangibly embodied in a machine readable storage device for execution by a computer processor; and method steps of the invention may be performed by one or more computer processors executing a program to perform functions of the invention by operating on input data and generating output. Suitable processors include, by way of example, both general and special purpose microprocessors. Generally, a processor will receive instructions and data from a read-only memory and/or a random access memory. Storage devices suitable for tangibly embodying computer program instructions include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Other embodiments are within the scope of the following claims. For example, the order of performing steps of the invention or the ordering, structuring or naming of data structures of the invention may be changed by those skilled in the art and still achieve desirable results.

A client system may rely, for example, on only one specified parsing server to convert data.

Parsing servers, at intervals, may broadcast messages over the WAN announcing their capabilities, and client systems may update their parsing server lists accordingly.

Client systems, at intervals, may broadcast messages over the WAN asking parsing servers to identify themselves and their capabilities and the client systems may use the responses to update their parsing server lists accordingly.

A client system may keep track of errors encountered when attempting to utilize a given parsing server, and delete the corresponding parsing server capability descriptor from TheParsingServerList if errors occurred at more than a specified frequency.

A client system may initially obtain the file specified by TheURL from the File Server and determine its Format. If it cannot process the file with its own facilities, it may engage in a process of finding appropriate parsing servers such that each PARSE_AND_TRANSMIT message includes the actual file instead of the URL for the file, and the parsing server parses the included file, rather than obtaining it from a File Server.

TheParsingServerList may include a list of parsing servers, without capability information, and when a client system needs to convert a given file, it may query all of the parsing servers on TheParsingServerList to determine which, if any, is capable of doing the required transformation.

Client systems may, alternatively, not maintain a parsing server list. If a parsing server is needed, the client system may broadcast a query message over the WAN to determine whether any parsing servers could perform the needed conversion. The client system may use a parsing server which responds affirmatively to its query message.

A client system may request one parsing server to translate data to an intermediate format and then after receiving the translated data, request a second parsing server to translate the data from the intermediate format to a final format.

The TheParsingServer may be chosen from the CapableParsingServerList according to a prioritization heuristic.

What is claimed is:

1. In a data network in which a multiplicity of data formats exist, a method for performing a particular function on data, the method comprising:

determining in a client system in what first data format the data is represented and then using the determined first data format to search the client system for a first resource for performing the function on the data in the first data format;

upon failing to locate a first resource on the client system for performing the function on the data in the first data format, searching the client system for a second resource for performing the function on the data in any other, second data format;

upon finding such a second resource, searching for a parsing server that can parse data from the first data format to the second data format and then transmitting the data to the parsing server;

parsing the data at the parsing server into the second data format;

receiving on the client system the data parsed into the second data format from the parsing server; and using the second resource on the client system to perform the function on the parsed data.

2. The method of claim 1, wherein the data resides on the client system and is transmitted by the client system to the parsing server.

3. The method of claim 1, wherein searching for a parsing server comprises:

providing a pre-existing list of parsing servers, each parsing server on the list being identified by a data structure including a convert-from data format identifier and a convert-to data format identifier; and searching the list for a parsing server having a convert-from data format matching the first data format and a convert-to data format matching the second data format.

4. The method of claim 3, wherein the pre-existing list of parsing servers is generated using information broadcast to the network by parsing servers.

5. The method of claim 3, wherein the pre-existing list of parsing servers is generated using information sent by parsing servers in response to messages broadcast to the network by the client system.

6. The method of claim 3, wherein the step of selecting the parsing server comprises:

identifying the first data format;

identifying which resources on the client system can perform the function;

identifying a set of data formats upon which the resources can perform the function;

identifying translation capabilities of parsing servers on the list;

identifying a set of parsing servers which are capable of translating data from the first data format to one of the identified set of data formats; and choosing a parsing server from the set of parsing servers which is capable of translating from the first data format to a data format from the identified set of data formats.

7. The method of claim 6, wherein the step of identifying the translation capabilities of parsing servers comprises accessing data stored on the client system.

8. The method of claim 6, wherein the step of identifying the translation capabilities of parsing servers comprises sending messages to parsing servers over the network requesting them to indicate their translation capabilities and receiving messages from parsing servers indicating their capabilities.

9. The method of claim 1, further comprising:

broadcasting a request to the network, the request comprising a convert-to field identifying the second data format and a convert-from field identifying the first data format.

10. The method of claim 1, wherein the network is a wide area network.

11. The method of claim 1, wherein the network is a local area network.

12. The method of claim 1, further comprising:

transmitting a request message from the client system to the parsing server before transmitting the data to the parsing server.

13. The method of claim 12, wherein the request message comprises a Uniform Resource Locator specifying the location of the data on the network.

14. The method of claim 12, wherein the request message specifies the second data format.

15. The method of claim 12, wherein the request message specifies the first data format.

16. In a network in which a multiplicity of data formats are recognized, a method for performing a particular function on data, the method comprising:

determining in a client system in what first data format the data is represented and then using the determined first data format to search the client system for a first resource to perform the function on the data in the first data format;

upon determining that the client system lacks a first resource to perform the function on the data in the first data format, identifying which resources on the client system can perform the function;

identifying a set of data formats other than the first data format upon which the identified resources can perform the function;

identifying a set of parsing servers which are capable of translating data from the first data format to any one of the identified set of data formats;

choosing a parsing server from the set of parsing servers;

sending a request message from the client system to the chosen parsing server, specifying a URL of the data, the first data format, and the second data format;

sending the data specified by the URL from a data server to the chosen parsing server;

parsing the data from the first data format to the second data format at the chosen parsing server;

sending the parsed data in the second data format from the chosen parsing server to the client system; and using one of the identified resources on the client system to perform the function on the parsed data in the second data format.

17. In a data network, a method for performing a particular function on data, the method comprising:

determining in a client system in what first data format the data is represented and then using the determined first data format to search the client system for a first resource to perform the function on the data in the first data format;

upon failing to locate a first resource on the client system to perform the function on the data in the first data format, transmitting the data in the first data format to a first parsing server;

parsing the data at the first parsing server into a second data format;

transmitting the parsed data in the second data format to a second parsing server;

parsing the parsed data in the second data format into a third data format at the second parsing server; and receiving on the client system the data parsed into the third data format from the second parsing server.

18. A computer program residing on a computer-readable medium for performing a particular function on data, the program comprising instructions to:

determine in a client system in what first data format the data is represented and then search the client system for a first resource to perform the function on the data in the first data format;

upon failing to locate the first resource on the client system to perform the function on the data in the first data format, search the client system for a second resource for performing the function on the data in any other, second data format;

upon finding such a second resource, search for a parsing server that can parse data from the first data format to the second data format and then transmit the data to the parsing server;

parse the data at the parsing server into the second data format;

receive on the client system the data in the second data format from the parsing server; and use the second resource on the client system to perform the function on the data received in the second data format.

19. In a network of computers, a method comprising:

receiving on a client system a request that a particular function be performed on particular data;

after the request is received, determining in a client system in what first data format the data is represented; and after the request is received, comparing on the client system the requested function with the functions that can be performed by resources on the client system, and if a first resource on the client system can perform the function on data in the first data format then using the first resource to do so, and otherwise if a second resource on the client system can perform the function but only on data in a second format, then determining whether a parsing server exists on the network that can convert the first data format to the second data format and, if so, performing the actions of:

identifying one such parsing server and transmitting a request message from the client system to the identified parsing server;

transmitting the data to the identified parsing server;

parsing the data in the identified parsing server into the second data format;

transmitting the data in the second data format from the parsing server to the client system; and using the identified second resource on the client system to perform the function on the received data in the second data format.

20. A computer program residing on a computer-readable medium for execution on a client system, the program comprising instructions to:

receive on a client system a request that a particular function be performed on particular data;

determine in the client system, after the request is received, in what first data format the data is represented; and compare the requested function on the client system, after the request is received, with the functions that can be performed by resources on the client system, and if a first resource on the client system can perform the function on data in the first data format then use the first resource to do so, and otherwise if a second resource on the client system can perform the function but only on data in a second format, then determine whether a parsing server exists on the network that can convert the first data format to the second data format and, if so, execute instructions of the program to:

identify one such parsing server and transmit a request message from the client system to the identified parsing server requesting the parsing server to parse the data into the second data format;

cause the data to be transmitted to the identified parsing server;

receive on the client system the data in the second data format from the parsing server; and use the identified resource on the client system to perform the requested function on the received data in the second data format.

* * * * *